United States Patent
Huber et al.

(10) Patent No.: US 11,437,890 B2
(45) Date of Patent: Sep. 6, 2022

(54) PASSIVELY-COOLED BRUSH MODULE FOR A SLIP RING SYSTEM OF AN ELECTRIC MACHINE ENERGIZED BY CURRENT, ELECTRIC MACHINE AND MOTOR VEHICLE

(71) Applicant: Bayerische Motoren Werke Aktiengesellschaft, Munich (DE)

(72) Inventors: Andreas Huber, Schoenberg (DE); Philip Moerth, Munich (DE); Roman Svach, Luhacovice (CZ)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/284,569

(22) PCT Filed: Dec. 3, 2019

(86) PCT No.: PCT/EP2019/083385
§ 371 (c)(1),
(2) Date: Apr. 12, 2021

(87) PCT Pub. No.: WO2020/148014
PCT Pub. Date: Jul. 23, 2020

(65) Prior Publication Data
US 2021/0336512 A1 Oct. 28, 2021

(30) Foreign Application Priority Data
Jan. 14, 2019 (DE) .................. 10 2019 100 729.1

(51) Int. Cl.
*H02K 9/28* (2006.01)
*H01R 39/38* (2006.01)
(Continued)

(52) U.S. Cl.
CPC ............. *H02K 9/28* (2013.01); *H01R 39/385* (2013.01); *H01R 39/388* (2013.01); *H02K 5/141* (2013.01);
(Continued)

(58) Field of Classification Search
CPC ........ H02K 9/28; H02K 5/141; H02K 13/003; H02K 5/14; H02K 5/143; H02K 5/145;
(Continued)

(56) References Cited

U.S. PATENT DOCUMENTS

| 4,799,309 A | * | 1/1989 | Cinzori | ................ | H02K 11/046 |
| | | | | | 257/E25.026 |
| 6,525,439 B2 | * | 2/2003 | Whelan | .................. | H02K 11/33 |
| | | | | | 310/239 |

(Continued)

FOREIGN PATENT DOCUMENTS

| DE | 102 39 433 A1 | 3/2004 |
| DE | 10 2008 041 811 A1 | 3/2010 |

(Continued)

OTHER PUBLICATIONS

International Search Report (PCT/ISA/210) issued in PCT Application No. PCT/EP2019/083385 dated Feb. 17, 2020 with English translation (four (4) pages).
(Continued)

*Primary Examiner* — Ahmed Elnakib
(74) *Attorney, Agent, or Firm* — Crowell & Moring LLP

(57) ABSTRACT

A brush apparatus for a slip ring system of a current-energized electric machine for a motor vehicle is provided for supplying a rotor of the electric machine with current, wherein the brush apparatus is securable to a component of the electric machine that is mounted in fixed relation to the rotor. The brush apparatus includes a brush carrier having a cartridge-type holder and a brush arranged in the cartridge- (Continued)

type holder and forming a sliding contact with a slip ring of the slip ring system. The brush apparatus also includes a retaining device, formed from an electrically insulating material for retaining the brush carrier, which has a securing region for securing the brush apparatus on the component, and a heat-conducting core enclosed in the retaining device, which is exposed for the purpose of heat dissipation at least in the securing region of the retaining device that is couplable to the component.

9 Claims, 2 Drawing Sheets

(51) Int. Cl.
    *H02K 5/14*     (2006.01)
    *B60K 6/26*     (2007.10)

(52) U.S. Cl.
    CPC ............. *B60K 6/26* (2013.01); *B60Y 2200/91* (2013.01); *B60Y 2200/92* (2013.01); *B60Y 2400/60* (2013.01)

(58) Field of Classification Search
    CPC ...... H02K 5/146; H02K 5/148; H01R 39/385; H01R 39/388; H01R 39/38; H01R 39/386; H01R 39/39; B60K 6/26; B60Y 2200/91; B60Y 2200/92; B60Y 2400/60
    USPC .................................................. 310/64, 242
    See application file for complete search history.

(56) References Cited

U.S. PATENT DOCUMENTS

| | | | |
|---|---|---|---|
| 2003/0020304 A1 | 1/2003 | Whelan et al. | |
| 2019/0140521 A1* | 5/2019 | Deuke | H02K 9/28 |
| 2021/0336512 A1* | 10/2021 | Huber | H02K 5/141 |

FOREIGN PATENT DOCUMENTS

| | | | |
|---|---|---|---|
| JP | 2002142403 | * | 5/2002 |
| WO | WO 2005/078907 A1 | | 8/2005 |

OTHER PUBLICATIONS

German-language Written Opinion (PCT/ISA/237) issued in PCT Application No. PCT/EP2019/083385 dated Feb. 17, 2020 (seven (7) pages).

* cited by examiner

PASSIVELY-COOLED BRUSH MODULE FOR A SLIP RING SYSTEM OF AN ELECTRIC MACHINE ENERGIZED BY CURRENT, ELECTRIC MACHINE AND MOTOR VEHICLE

BACKGROUND AND SUMMARY OF THE INVENTION

The invention relates to a brush module for a slip ring system of a current-excited electric machine for a motor vehicle for energizing a rotor of the electric machine, wherein the brush module is able to be fixed to a component of the electric machine that is stationarily mounted with respect to the rotor. The brush module has at least one brush carrier having at least one tubular brush holder and at least one brush, wherein the brush is arranged in the tubular brush holder and, for energizing the rotor, forms a sliding contact with a slip ring of the slip ring system arranged on the rotor. The brush module additionally has a holding device formed of an electrically insulating material for holding the brush carrier, which holding device has at least one fixing region for fixing the brush module to the component. The invention relates additionally to a current-excited electric machine and to a motor vehicle.

In the present case, interest is focused on current-excited, or externally excited, electric machines for motor vehicles. Such machines can be used, for example, as drive machines for electrically drivable motor vehicles, that is to say electric or hybrid vehicles. Externally excited electric machines have a stationarily mounted stator with energizable stator windings, and a rotor, rotatably mounted with respect to the stator, with energizable rotor windings. The electric machine can be in the form of an internal rotor machine, in which the stator surrounds the rotor, or in the form of an external rotor machine, in which the rotor surrounds the stator. For energizing the rotor windings there is conventionally used a slip ring system which has at least one slip ring and a brush module. The slip ring is arranged in a rotationally fixed manner on the rotor, for example, on a shaft of the rotor, and can accordingly rotate together with the rotor. The brush module is arranged stationarily with respect to the rotor and is fixed, for example, to a housing of the electric machine. The brush module thereby has a brush carrier with brushes. The brushes and the slip ring form an electrical sliding contact or slip contact, by means of which current can be transmitted to the rotor windings of the rotating rotor.

During operation of the electric machine, increased heat development can occur at the brushes. From DE 102 39 433 A1 there is known an electric machine having a brush carrier which is produced from an electrically insulating material, and having at least one brush arranged in a tubular brush holder. The tubular brush holder is produced from a conducting material and arranged exposed on the brush carrier. Although this exposed arrangement allows the heat to be released to the environment, the maximum possible cooling capacity is limited.

The object of the present invention is to provide particularly efficient cooling for a slip ring system of a current-excited electric machine for a motor vehicle.

This object is achieved according to the invention by a brush module, an electric machine and a motor vehicle having the features according to the respective independent patent claims. Advantageous embodiments of the invention are subject-matter of the dependent patent claims, the description and the figures.

A brush module according to the invention for a slip ring system of a current-excited electric machine for a motor vehicle serves to energize a rotor of the electric machine. The brush module is able to be fixed to a component of the electric machine that is stationarily mounted with respect to the rotor. The brush module has at least one brush carrier having at least one tubular brush holder and at least one brush, wherein the brush is arranged in the tubular brush holder and, for energizing the rotor, forms a sliding contact with a slip ring of the slip ring system arranged on the rotor. The brush module additionally has a holding device formed of an electrically insulating material for holding the brush carrier, which holding device has at least one fixing region for fixing the brush module to the component. In addition, the brush module has a heat-conducting core which is enclosed in the holding device and, for dissipating heat from the brush module to the component, is configured so as to be exposed at least in the fixing region, which is able to be coupled with the component, of the holding device.

The invention relates additionally to a current-excited electric machine having a stator, a rotor which is rotatably mounted relative to the stator, and a slip ring system having at least one slip ring and at least one brush module according to the invention. The at least one slip ring is arranged in a rotationally fixed manner on the rotor, and the at least one brush module is arranged stationarily with respect to the rotor and fastened to a component of the electric machine. The component is preferably a housing of the electric machine.

The electric machine is a current-excited, or externally excited, electric machine which can be used, for example, as a traction machine for an electrically drivable motor vehicle. In a current-excited electric machine, the rotor has at least one rotor winding, or exciter winding, which must be energized in order to operate the electric machine. Since the rotor rotates with respect to the stator, the slip ring system having the at least one slip ring and the brush module is used for transmitting current to the rotor winding. The slip ring is thereby fastened in a rotationally fixed manner to the rotor, for example, to a shaft of the rotor, and can rotate together with the rotor. The brush module is mounted stationarily with respect to the rotor and the slip ring and is thereby fixed in particular to the housing of the electric machine.

The brush module has the holding device, which is produced from an electrically insulating material, for example, plastics material. The holding device has the at least one fixing region, for example, in the form of a screw hole, via which the holding device and thus the brush module as a whole can be fastened to the component, for example, the housing of the electric machine. The holding device additionally serves to hold the brush carrier and to electrically insulate the brush carrier, which is produced in particular from a metallic material, for example, brass, from the component of the electric machine. The at least one tubular brush holder, in which the at least one brush, or carbon brush, is arranged, is fastened to the brush carrier. The at least one tubular brush holder is fastened to the brush carrier by crimping and/or latching, for example, and is in particular likewise formed of an electrically conductive material. The brush faces the slip ring and forms an electrical sliding contact via which, when the rotor is rotating, current can be transmitted through the exciter winding to the rotor winding. The current can be supplied to the brushes via lines which can be electrically connected to the electrically conductive brush carrier. For example, ends of the lines can have cable shoes which, for electrical connection to the brush carrier, are screwed to the brush carrier.

In order to be able to efficiently dissipate heat which develops at the brushes during operation of the electric machine and thus to be able to passively cool the brush module, the brush module has the heat-conducting core, or thermally conductive core. The heat-conducting core is in particular formed of a metallic and thus highly heat-conductive material, preferably of aluminum. In order to electrically insulate the thermally and also electrically conductive heat-conducting core from the brush carrier, it is enclosed in the holding device. In other words, electrically insulating material of the holding device is arranged between the brush carrier and the heat-conducting core. The heat-conducting core is thus encased at least in some regions by the holding device and thus electrically insulated with respect to the brush carrier. The heat-conducting core serves to form a heat-conducting path from the brushes to the component which has reduced thermal resistance compared to a heat-conducting path via plastics material. The heat-conducting core accordingly improves heat transmission from the brushes to the component and thus passive cooling of the brushes.

For this purpose, the heat-conducting core can be brought into contact with the component in that the heat-conducting core is exposed in the fixing region of the holding device. The heat-conducting core can thus be brought, for example, into direct contact with a fixing means, for example, a screw or a bolt, via which the brush module is fastened to the component. Alternatively or in addition, the heat-conducting core can be in direct contact with the component by lying directly against the component. Via this heat-conducting path, which leads from the brushes via the heat-conducting core to the component, the heat can be released to the component. The release of heat to the component in the form of the housing of the electric machine is particularly advantageous since the housing is in any case conventionally actively cooled in order to cool the electric machine.

In a further development of the invention, the holding device, the at least one brush carrier and the heat-conducting core are each plate-shaped and each have a through-opening for the rotor, wherein the at least one brush carrier is arranged on a surface of the holding device and so as to overlap at least in some regions the heat-conducting core enclosed in the holding device. The holding device and the heat-conducting core preferably have a triangular shape, wherein the holding device has three fixing regions arranged at vertices of the triangular shape. The holding device is thus fixed at three points, namely its vertices. The through-openings of the holding device, of the at least one brush carrier and of the heat-conducting core are thereby arranged in alignment with one another, so that the shaft of the rotor carrying the at least one slip ring can be guided through. The at least one brush carrier is thereby arranged on one of the surfaces of the holding device. An area of the brush carrier is thereby in particular smaller than an area of the holding device. The at least one tubular brush holder of the brush carrier is thereby arranged at an edge of the through-opening, so that the brush projects into the through-opening. The at least one brush carrier in particular has three tubular brush holders which are arranged distributed around the through-opening.

In particular, the brush module has two brush carriers each having at least one tubular brush holder and a brush, wherein a first brush carrier is arranged on a first surface in the form of an upper side of the holding device and a second brush carrier is arranged on a second surface, located opposite the first surface, in the form of a lower side of the holding device and wherein the heat-conducting core is arranged in the holding device between the first and the second brush carrier.

In order to integrate the plate-shaped heat-conducting core into the holding device, the heat-conducting core can be overmolded, for example, with a plastics material forming the holding device. An area of the plate-shaped heat-conducting core is thereby larger than the area of the brush carrier. An upper side and a lower side of the heat-conducting core are thereby covered by the material of the holding device at least in the region overlapping the brush carrier. Lateral regions of the heat-conducting core are in particular covered completely by the material of the holding device. Only in the fixing region of the holding device, for example, in an edge region of the plate-shaped holding device, is the heat-conducting core exposed and able to dissipate the heat directly and/or indirectly to the component.

Preferably, the fixing region is in the form of a screw hole and the heat-conducting core has a cylindrical region which encases the screw hole and extends from an upper side of the holding device to a lower side of the holding device, so that, on fixing of the brush module by means of screws, the heat-conducting core is thermally coupled with the component via the screw. The heat-conducting core is thus exposed in the region of the screw hole and forms an inner side of the screw hole. When the screw is guided through the screw hole and when the screw is screwed to the component, the heat is dissipated via the exposed heat-conducting core and the screw to the component. Moreover, a thickness of the heat-conducting core is increased in the fixing region of the holding device, so that the heat-conducting core is thus additionally exposed on the upper side and the lower side of the holding device. An annular portion of the exposed heat-conducting core is thus visible on the upper side and the lower side.

In a further development of the invention, the at least one brush carrier is formed of an electrically conductive material and fastened to the holding device by means of at least one electrically conductive fastening means, wherein the heat-conducting core arranged inside the holding device has at least one through-hole through which the at least one fastening means is guided without touching the heat-conducting core. The fastening means is in particular a rivet, by means of which the brush carrier is riveted to the holding device. For this purpose, the brush carrier has at least one rivet hole. In order to prevent an electrical connection between the heat-conducting core and the fastening means, which is arranged in some regions in the holding device, the heat-conducting core has the through-hole, the diameter of which is greater than a diameter of the fastening means. The at least one through-hole is thereby arranged in alignment with the rivet hole. The fastening means can thus be arranged in the holding device without touching the thermally and electrically conductive heat-conducting core.

The invention additionally includes a motor vehicle having a current-excited electric machine according to the invention. The motor vehicle is in particular an electric or hybrid vehicle and has the electric machine as the traction machine or drive machine.

The embodiments presented in relation to the brush module according to the invention and the advantages thereof apply correspondingly to the electric machine according to the invention and to the motor vehicle according to the invention.

Further features of the invention will become apparent from the claims, the figures and the description of the figures. The features and feature combinations mentioned hereinbefore in the description and the features and feature combinations mentioned hereinbelow in the description of the figures and/or shown in the figures alone are usable not only in the combination indicated in each case but also in other combinations or in isolation.

The invention will now be explained in greater detail by means of a preferred exemplary embodiment and with reference to the drawings, in which:

DETAILED DESCRIPTION OF THE DRAWINGS

Figure 1:
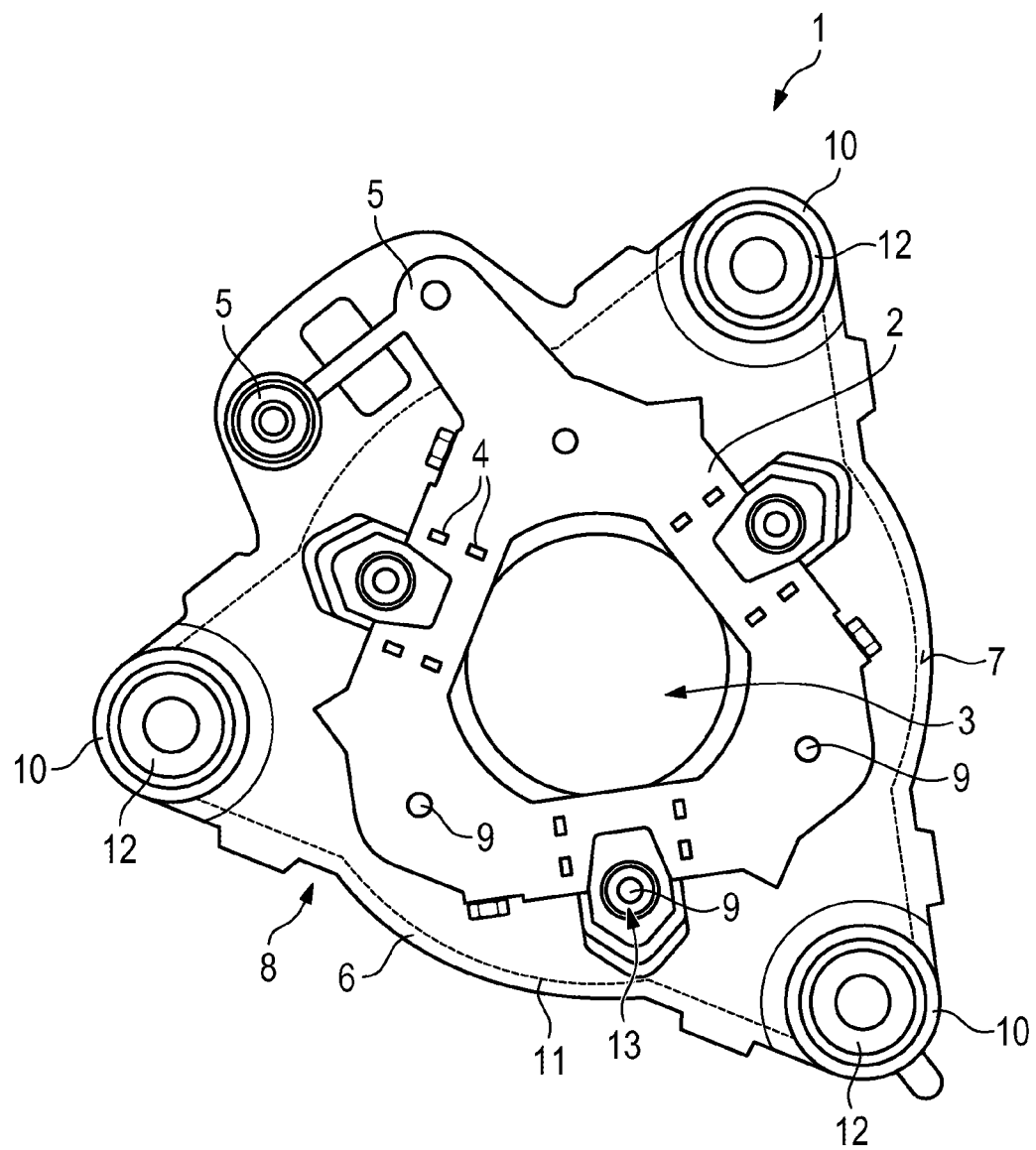
FIG. 1 is a schematic representation of an embodiment of a brush module according to the invention in a plan view.

In the figures, the same elements and elements having the same function are provided with the same reference numerals.

FIG. 1 shows a brush module 1 for a slip ring system of a current-excited electric machine, not shown here, of a motor vehicle. The brush module 1 is arranged stationarily with respect to a rotor of the electric machine and transmits electrical energy for energizing rotor windings of the rotor to at least one slip ring, arranged on the rotor, of the slip ring system. The brush module 1 here has two brush carriers 2 which are in the form of metal plates with through-openings 3 for the passage of a shaft, which carries the slip ring, of the rotor. Each brush carrier 2 has tubular brush holders, not shown here, which are fastened to the brush carrier 2. For example, the brush carrier 2 can have latching holes 4 which latch with latching projections of the tubular brush holders. The tubular brush holders form receiving pockets for brushes, not shown here. In each tubular brush holder there is arranged a brush which is electrically connected to the brush carrier 2 and forms an electrical sliding contact with the slip ring. The brush carriers 2 have connections 5, which here are in the form of screw connections. To these screw connections there can be connected electrical lines by means of cable shoes, which supply a current to the brush carrier 2 and thus to the brushes. This current is transmitted from the brushes to the slip ring of the rotor and from the slip ring to the rotor windings.

The brush module 1 additionally has a holding device 6 which is formed of an electrically insulating material, for example, plastics material. The holding device 6 is likewise plate-shaped with the through-hole 3 and has an upper side 7 and a lower side 8 opposite the upper side 7. A first brush carrier 2 is fastened abutting the upper side 7, and a second brush carrier 2 is fastened abutting the lower side 8. The brush carriers 2 here have rivet holes 9 via which the brush carriers 2 are fixedly riveted to the holding device 6 by means of rivets, not shown here. The holding device 6 here has three fixing regions 10, which here are in the form of screw holes or screw bushes. By means of fixing means, for example, by means of screws or bolts, the holding device 6 and thus the brush module 1 can be fastened to a component of the electric machine, for example to a housing of the electric machine.

Figure 2:
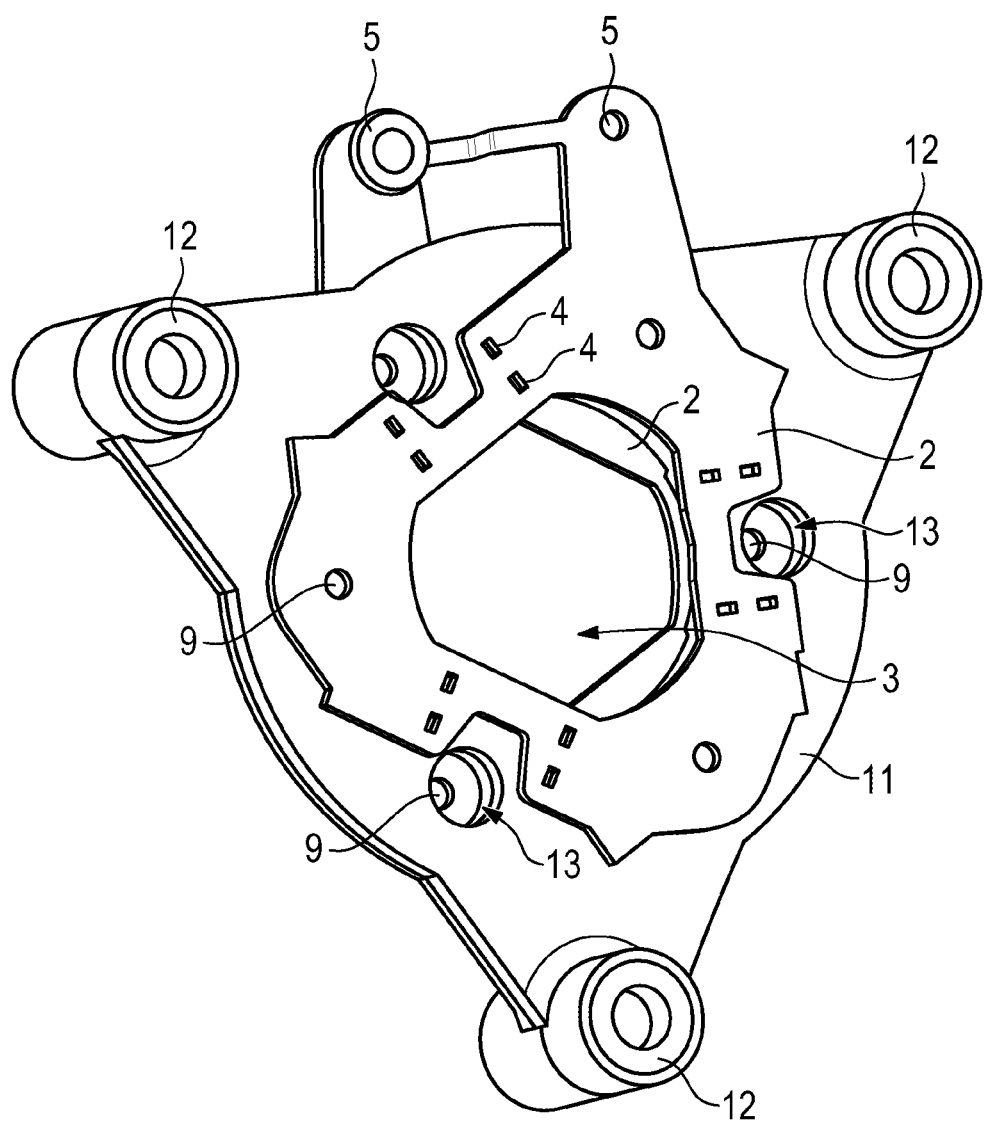
FIG. 2 is a perspective representation of a holding device and of a thermally conductive heat-conducting core of the brush module.

The brush module 1 additionally has a heat-conducting core 11 of a thermally conductive material, which is designed to dissipate heat produced by the brushes during operation of the electric machine. The heat-conducting core 11 is enclosed in the holding device 6, or encased by the holding device 6. The heat-conducting core 11 is likewise plate-shaped with the through-opening 3 and is electrically insulated from the brush carriers 2 by the encasing holding device 6. In FIG. 1, the holding device 6 is shown in transparent form for the purpose of better visibility of the heat-conducting core 11 located therein. In FIG. 2, the brush module 1 is shown without the holding device 6.

The heat-conducting core 11 is exposed in the fixing regions 10, so that, when fixed to the component, it is in thermal contact with the component. For this purpose, the heat-conducting core 11 has in the region of the fixing regions 10 of the holding device 6 cylindrical regions 12 which extend from the upper side 7 to the lower side 8 of the holding device 6. The cylindrical region 12 is thus exposed on the upper side 7 and the lower side 8 of the holding device 6 and additionally forms the inner side of the screw hole. Thus, when the brush module 1 is fastened by means of the screws to the component of the electric machine, the heat can be transmitted via the screws to the component and the brush module 1 can accordingly be passively cooled.

The heat-conducting core 11 is formed in particular of a metal, for example, aluminum. Since the metal is both thermally and electrically conductive, it must be ensured that there is no electrical connection between the brush carriers 2 and the heat-conducting core 11, for example, via the rivets. The heat-conducting core 11 therefore has through-openings 13 which are arranged in alignment with the rivet holes 9 of the brush carriers 2. The rivets can be guided through these through-openings 13 without touching and thus electrically contacting the heat-conducting core 11.

LIST OF REFERENCE NUMERALS 1 brush module
2 brush carrier
3 through-hole
4 latching holes
5 connection
6 holding device
7 upper side
8 lower side
9 rivet holes
10 fixing regions
11 heat-conducting core
12 cylindrical regions
13 through-holes

What is claimed is:

1. A brush apparatus for a slip ring system of a current-excited electric machine for a motor vehicle for energizing a rotor of the electric machine, wherein the brush apparatus is fixable to a component of the electric machine that is stationarily mounted with respect to the rotor, the brush apparatus comprising:
at least one brush carrier having at least one tubular brush holder and at least one brush arranged in the tubular brush holder, which brush, for energizing the rotor, forms a sliding contact with a slip ring of the slip ring system arranged on the rotor; and
a holding device formed of an electrically insulating material for holding the brush carrier, the holding device having at least one fixing region for fixing the brush apparatus to the component;
wherein a heat-conducting core, which is enclosed in the holding device and which, for heat dissipation from the brush apparatus to the component, is configured so as to be exposed at least in the fixing region, is couplable with the component; and wherein the fixing region is in the form of a screw hole and the heat-conducting core has a cylindrical region which encases the screw hole and extends from an upper side of the holding device to a lower side of the holding device, so that, on fixing of the brush apparatus by means of screws, the heat-conducting core is thermally connected to the component.

2. The brush apparatus according to claim 1, wherein the thermally conductive heat-conducting core is formed of aluminum.

3. The brush apparatus according to claim 1, wherein the holding device, the at least one brush carrier and the heat-conducting core are each plate-shaped and have a through-opening for the rotor, wherein the at least one brush carrier is arranged on a surface of the holding device and so as to overlap at least in some regions the heat-conducting core enclosed in the holding device.

4. A current-excited electric machine having a stator, a rotor rotatably mounted with respect to the stator, and a slip ring system having at least one slip ring and at least one brush apparatus according to claim 1, wherein the at least one slip ring is arranged stationarily on the rotor and the at least one brush apparatus is arranged stationarily with respect to the rotor and is fastened to a component of the electric machine.

5. The current-excited electric machine according to claim 4, wherein the component is a housing of the electric machine.

6. A motor vehicle having an electric machine according to claim 4.

7. A brush apparatus for a slip ring system of a current-excited electric machine for a motor vehicle for energizing a rotor of the electric machine, wherein the brush apparatus is fixable to a component of the electric machine that is stationarily mounted with respect to the rotor, the brush apparatus comprising:
at least one brush carrier having at least one tubular brush holder and at least one brush arranged in the tubular brush holder, which brush, for energizing the rotor, forms a sliding contact with a slip ring of the slip ring system arranged on the rotor; and
a holding device formed of an electrically insulating material for holding the brush carrier, the holding device having at least one fixing region for fixing the brush apparatus to the component;
wherein a heat-conducting core, which is enclosed in the holding device and which, for heat dissipation from the brush apparatus to the component, is configured so as to be exposed at least in the fixing region, is couplable with the component;
wherein the holding device, the at least one brush carrier and the heat-conducting core are each plate-shaped and have a through-opening for the rotor, wherein the at least one brush carrier is arranged on a surface of the holding device and so as to overlap at least in some regions the heat-conducting core enclosed in the holding device; and
wherein the holding device and the heat-conducting core have a triangular shape and the holding device has three fixing regions arranged at vertices of the triangular shape.

8. A brush apparatus for a slip ring system of a current-excited electric machine for a motor vehicle for energizing a rotor of the electric machine, wherein the brush apparatus is fixable to a component of the electric machine that is stationarily mounted with respect to the rotor, the brush apparatus comprising:
at least one brush carrier having at least one tubular brush holder and at least one brush arranged in the tubular brush holder, which brush, for energizing the rotor, forms a sliding contact with a slip ring of the slip ring system arranged on the rotor; and
a holding device formed of an electrically insulating material for holding the brush carrier, the holding device having at least one fixing region for fixing the brush apparatus to the component;
wherein a heat-conducting core, which is enclosed in the holding device and which, for heat dissipation from the brush apparatus to the component, is configured so as to be exposed at least in the fixing region, is couplable with the component;
wherein the holding device, the at least one brush carrier and the heat-conducting core are each plate-shaped and have a through-opening for the rotor, wherein the at least one brush carrier is arranged on a surface of the holding device and so as to overlap at least in some regions the heat-conducting core enclosed in the holding device; and
wherein the brush apparatus has two brush carriers each having at least one tubular brush holder and a brush, wherein a first brush carrier is arranged on a first surface in the form of an upper side of the holding device and a second brush carrier is arranged on a second surface, located opposite the first surface, in the form of a lower side of the holding device, and wherein the heat-conducting core is arranged in the holding device between the first and the second brush holder.

9. A brush apparatus for a slip ring system of a current-excited electric machine for a motor vehicle for energizing a rotor of the electric machine, wherein the brush apparatus is fixable to a component of the electric machine that is stationarily mounted with respect to the rotor, the brush apparatus comprising:
at least one brush carrier having at least one tubular brush holder and at least one brush arranged in the tubular brush holder, which brush, for energizing the rotor, forms a sliding contact with a slip ring of the slip ring system arranged on the rotor; and
a holding device formed of an electrically insulating material for holding the brush carrier, the holding device having at least one fixing region for fixing the brush apparatus to the component;
wherein a heat-conducting core, which is enclosed in the holding device and which, for heat dissipation from the brush apparatus to the component, is configured so as to be exposed at least in the fixing region, is couplable with the component,
wherein the at least one brush carrier is formed of an electrically conductive material and is fastened to the holding device by at least one electrically conductive fastening means, wherein the heat-conducting core arranged inside the holding device has at least one through-hole through which the at least one fastening means is guided without touching the heat-conducting core.

* * * * *